United States Patent
Kotake et al.

(10) Patent No.: US 10,727,904 B2
(45) Date of Patent: Jul. 28, 2020

(54) COMMUNICATION DEVICE, COMMUNICATION METHOD AND PROGRAM

(71) Applicant: Mitsubishi Electric Corporation, Tokyo (JP)

(72) Inventors: Hiroaki Kotake, Tokyo (JP); Masahiro Ishihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/497,516

(22) PCT Filed: Jun. 16, 2017

(86) PCT No.: PCT/JP2017/022356
§ 371 (c)(1),
(2) Date: Sep. 25, 2019

(87) PCT Pub. No.: WO2018/229976
PCT Pub. Date: Dec. 20, 2018

(65) Prior Publication Data
US 2020/0112336 A1    Apr. 9, 2020

(51) Int. Cl.
*H04B 3/56* (2006.01)
*H04B 3/54* (2006.01)

(52) U.S. Cl.
CPC ............. *H04B 3/544* (2013.01); *H04B 3/542* (2013.01); *H04B 3/56* (2013.01); *H04B 2203/542* (2013.01); *H04B 2203/5416* (2013.01)

(58) Field of Classification Search
CPC .......... H04B 3/544; H04B 3/542; H04B 3/56; H04B 2203/542; H04B 2203/5416
See application file for complete search history.

(56) References Cited

U.S. PATENT DOCUMENTS

| | | | |
|---|---|---|---|
| 5,642,857 A | 7/1997 | Totsuka et al. | |
| 2002/0063474 A1* | 5/2002 | Wasaki | H04B 3/56 307/89 |
| 2013/0249429 A1* | 9/2013 | Woytowitz | H05B 47/185 315/246 |
| 2020/0083744 A1* | 3/2020 | Vannucci | H01F 27/28 |

FOREIGN PATENT DOCUMENTS

| | | |
|---|---|---|
| JP | H03-152337 A | 6/1991 |
| JP | H08-271022 A | 10/1996 |
| JP | 2010-034846 A | 2/2010 |

* cited by examiner

*Primary Examiner* — Dac V Ha
(74) *Attorney, Agent, or Firm* — Posz Law Group, PLC

(57) ABSTRACT

A communication apparatus is connected to another communication apparatus via a power source line, a signal line, and a shared line. The communication apparatus includes a detector and a communicator. The detector detects the phase of an alternating-current voltage applied between a first terminal for connecting to the power source line and a second terminal for connecting to the shared line. The communicator communicates with the other communication apparatus by executing at least one of transmission or reception of an electric current signal generated by opening and closing a circuit including the signal line and the shared line except when the phase detected by the detector is within a specific range. The specific range is defined as a range in which an induced electric current flowing through the signal line due to the alternating-current voltage is greater than a reference value.

6 Claims, 13 Drawing Sheets

| RANGE TABLE | |
|---|---|
| R(1) | 150° − 210° |
| R(2) | 155° − 205° |
| R(3) | 160° − 200° |
| ⋮ | ⋮ |
| R(m−2) | 170° − 190° |
| R(m−1) | 175° − 185° |
| R(m) | −− |

COMMUNICATION DEVICE, COMMUNICATION METHOD AND PROGRAM

CROSS REFERENCE TO RELATED APPLICATION

This application is a U.S. national stage application of International Patent Application No. PCT/JP2017/022356 filed on Jun. 16, 2017, the content of which is incorporated herein by reference.

TECHNICAL FIELD

The present disclosure relates to a communication apparatus, a communication method, and a program.

BACKGROUND

Communication apparatuses that operate in communication with other devices have been widespread. For example, some techniques have been proposed that enable indoor units and an outdoor unit, which are air conditioners constituting an air conditioning system, to communicate with each other and thus operate in cooperation with each other (for example, refer to Patent Literature 1).

Patent Literature 1 discloses a system involving the indoor units and the outdoor unit that are connected to each other with a three-core cable including a power source line, a communication line, and a shared line. In this system, the air conditioners are supplied with electric power through the power source line and the shared line and communicate with each other through the communication line and the shared line.

PATENT LITERATURE

Patent Literature 1: Unexamined Japanese Patent Application Kokai Publication No. H08-271022

In the system disclosed in Patent Literature 1, if the cable connecting the air conditioners becomes longer, a current may be induced in the communication line due to the power source voltage depending on the line capacity and cause inductive noise, resulting in a failure in normal communication. That is, the technique disclosed in Patent Literature 1 applied to communication between the communication apparatuses may impair the quality of communication due to the inductive noise.

An objective of the present disclosure, which has been made in view of the above situations, is to improve the quality of communication.

SUMMARY

In order to achieve the above objective, a communication apparatus according to an aspect of the present disclosure, for connection to another communication apparatus via a power source line, a signal line, and a shared line, includes detection means and communication means. The detection means detects the phase of an alternating-current voltage applied between a first terminal for connecting to the power source line and a second terminal for connecting to the shared line. The communication means communicates with the other communication apparatus by executing at least one of transmission or reception of an electric current signal, which is generated by opening and closing of a circuit that includes the signal line and the shared line, except when the phase detected by the detection means is within a specific range. The specific range is defined as a range in which an induced electric current flowing through the signal line due to the alternating-current voltage is greater than a reference value.

According to the present disclosure, at least one of transmission or reception of electric current signals is executed except when the phase of the alternating-current voltage is within the specific range. The specific range is defined as a range in which an induced electric current flowing through the signal line due to the alternating-current voltage is greater than the reference value. Accordingly, the communication apparatuses communicate with each other except for the period in which inductive noise occurs. This configuration can improve the quality of communication.

BRIEF DESCRIPTION OF DRAWINGS

FIG. 10 illustrates an exemplary range table;

DETAILED DESCRIPTION

Embodiments of the present disclosure will now be described in detail with reference to the accompanying drawings.

Embodiment 1

Figure 1:
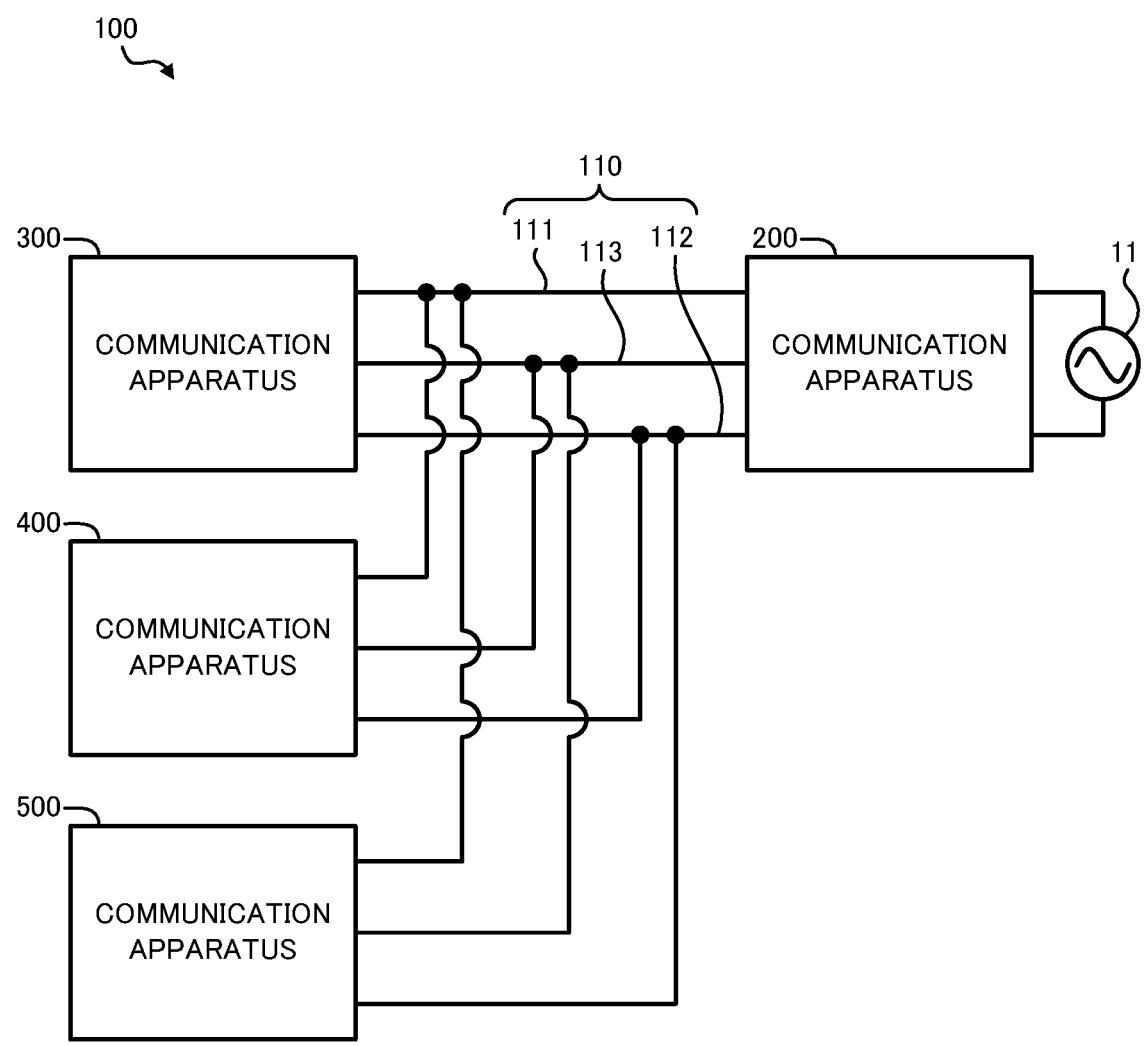
FIG. 1 illustrates a schematic configuration of a communication system according to Embodiment 1.

FIG. 1 illustrates a configuration of a communication system 100 according to an embodiment. The communication system 100 is an air conditioning system involving two or more air conditioners communicating with each other by transmitting and receiving signals. The communication system 100 limits the period of communication to a specific period and thus improves the quality of communication.

Alternatively, the communication system 100 may be other system involving two or more apparatuses communicating with each other. For example, the communication system 100 may be a video system in which a television receiver communicates with a recorder or a sound system in which a storage communicates with an amplifier.

The communication system 100 according to the embodiment involves a communication apparatus 200 being an outdoor unit and communication apparatuses 300, 400, and 500 being indoor units. The communication apparatus 200 is connected to each of the communication apparatuses 300, 400, and 500 via a cable 110.

The cable 110 is supplied with source power from an alternating-current power source 11 via a communication apparatus 200 and delivers the power to each of the communication apparatuses 300, 400, and 500. The cable 110 also transmits electric current signals used in serial communication between the communication apparatus 200 and each of the communication apparatuses 300, 400, and 500. The transmission of the electric current signals by the cable 110 enables the communication apparatus 200 and the communication apparatuses 300, 400, and 500 to perform air conditioning in cooperation with each other. The communication apparatus 300 does not directly communicate with the communication apparatus 400 or 500 but may indirectly communicate with the communication apparatuses 400 and 500 via the communication apparatus 200 to cooperate with the communication apparatuses 400 and 500.

The cable 110 includes a plurality of wires and an insulating coating. The cable 110 according to the embodiment is a three-core cable having a power source line 111 for supply of source power, a shared line 112 for both of supply of source power and transmission of electric current signals, and a signal line 113 for transmission of electric current signals.

The power source line 111 is an electric power line that connects the communication apparatus 200 to the communication apparatus 300. The power source line 111 branches at the middle and leads to the communication apparatuses 400 and 500. The shared line 112 is an electric wire that connects the communication apparatus 200 to the communication apparatus 300. The shared line 112 branches at the middle and leads to the communication apparatuses 400 and 500. The signal line 113 is a communication line that connects the communication apparatus 200 to the communication apparatus 300. The signal line 113 branches at the middle and leads to the communication apparatuses 400 and 500.

The alternating-current voltage of the alternating-current power source 11 is applied between the power source line 111 and the shared line 112 as the power source voltage of the communication apparatuses 300, 400, and 500. The power source line 111 and the shared line 112 constitute a circuit for supply of electric power to the communication apparatuses 300, 400, and 500. In contrast, the shared line 112 and the signal line 113 constitute a circuit for transmission of electric current signals between the communication apparatus 200 and each of the communication apparatuses 300, 400, and 500. The circuit constituted by the shared line 112 and the signal line 113 is equivalent to a so-called current loop for serial communication. The circuit constituted by the shared line 112 and the signal line 113 is hereinafter referred to as "signal circuit". The electric current signals correspond to the waveform patterns of the current flowing in the signal circuit.

Figure 2:
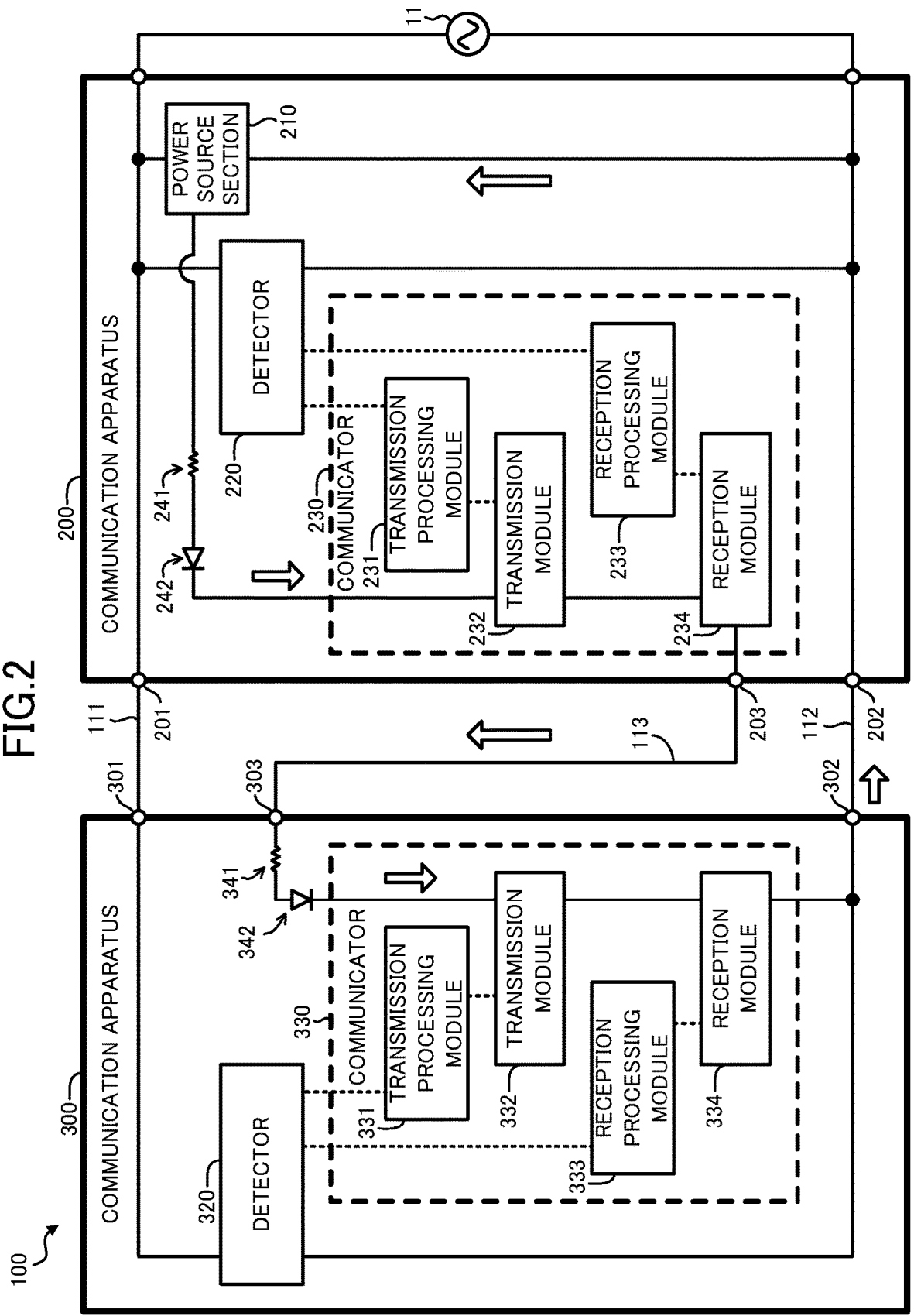
FIG. 2 illustrates configurations of communication apparatuses according to Embodiment 1.

FIG. 2 illustrates configurations for communication between the communication apparatus 200 and the communication apparatus 300. It should be noted that FIG. 2 illustrates only the communication apparatus 300 as a representative of the communication apparatuses 300, 400, and 500. The communication apparatuses 400 and 500 have a configuration similar to that of the communication apparatus 300. In FIG. 2, the components, such as an air-sending device and a refrigerant circuit including a refrigerant pump, an expansion valve, and a heat exchanger, for air conditioning operations of the communication apparatuses 200 and 300 are omitted.

The communication apparatus 200 operates on the source power supplied from the alternating-current power source 11. As illustrated in FIG. 2, the communication apparatus 200 includes a first terminal 201 for connection to the power source line 111, a second terminal 202 for connection to the shared line 112, a third terminal 203 for connection to the signal line 113, a power source section 210 for generation of electric current signals to be transmitted to and from the communication apparatus 300, a detector 220 that detects the phase of the power source voltage, a communicator 230 for communication with the communication apparatus 300, a resistor 241, and a diode 242 that reduces reverse current. Each of the first terminal 201 and the second terminal 202 is connected to the alternating-current power source 11. The power source voltage of the alternating-current power source 11 is applied between the first terminal 201 and the second terminal 202.

In FIG. 2, thin solid lines indicate electric wires and dashed lines indicate communication lines. The hollow arrows in FIG. 2 indicate a path of electric current signals.

The power source section 210 is provided with a rectifier circuit, such as a bridge circuit. The power source section 210 is connected to the first terminal 201 and the second terminal 202. The power source section 210 generates direct current power for generation of electric current signals, from the source power supplied from the alternating-current power source 11. The power source section 210 serves as a direct-current power source that causes a current to flow in the signal circuit. The power source section 210 is connected to the third terminal 203 via the resistor 241, the diode 242, and the communicator 230, so that the electric current signals are transmitted from the second terminal 202 to the third terminal 203.

The detector 220 functions as detection means of the communication apparatus 200. One end of the detector 220 is connected to the first terminal 201 and the other end of the detector 220 is connected to the second terminal 202. The detector 220 detects the phase of the source power supplied from the alternating-current power source 11 to the communication apparatus 300. That is, the detector 220 detects the phase of the voltage applied between the first terminal 201 and the second terminal 202 and thus detects the phase of the voltage applied between the power source line 111 and the shared line 112. The phase detected by the detector 220 is used in the communication by the communicator 230.

Figure 3:
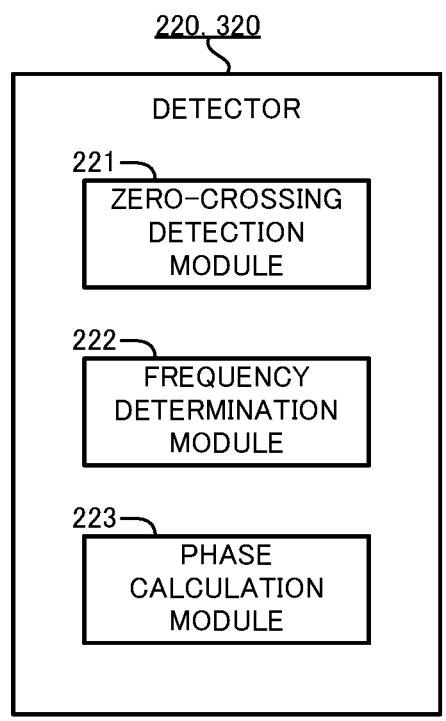
FIG. 3 illustrates a configuration of a detector.

With reference to FIG. 3, the detector 220 according to the embodiment includes a zero-crossing detection module 221 that detects timings when the power source voltage varying from one of the positive and negative values to the other passes through the value zero, a frequency determination module 222 that determines the frequency of the power source voltage based on the interval of the timings detected by the zero-crossing detection module 221, and a phase calculation module 223 that calculates the phase at present based on the timings detected by the zero-crossing detection module 221 and the frequency determined by the frequency determination module 222.

The zero-crossing detection module 221 has a so-called zero-crossing circuit. The frequency determination module 222 and the phase calculation module 223 each have a micro processing unit (MPU) and a random access memory (RAM). The phase at present calculated by the phase calculation module 223 is regarded as the phase detected by the detector 220.

For example, if the alternating-current power source 11 has a frequency of 50 Hz, the zero-crossing detection module 221 detects timings when the voltage passes through 0 V every 10 ms. When the frequency determination module 222 is notified of the timings detected every 10 ms by the zero-crossing detection module 221, the frequency determination module 222 determines the cycle of the power source voltage to be 20 ms and the frequency to be 50 Hz.

When 5 ms has elapsed from the timing most recently detected by the zero-crossing detection module 221, the phase calculation module 223 calculates that the phase at present is 90° or 270° based on the frequency of 50 Hz notified by the frequency determination module 222. After the initial phase calculation, the phase calculation module 223 calculates another phase based on the previously calculated phase. That is, at the time of elapse of 10 ms since the phase was determined to be 90°, the phase calculation module 223 determines the phase at present to be 270°. At the time of elapse of 10 ms since the phase was determined to be 270°, the phase calculation module 223 determines the phase at present to be 90°. Although the phase cannot be uniquely determined in the initial calculation in general, any one phase may be selected in accordance with predetermined rules. Even if the phase calculation module 223 calculates the phase in accordance with such a phase selection, no problem in the communication by the communicator 230 is caused.

The zero-crossing detection module 221 according to the embodiment does not distinguish the timing when the power source voltage varies from the positive value to the negative value, from the timing when the voltage varies from the negative value to the positive value. Alternatively, the zero-crossing detection module 221 may distinguish these timings from each other. If these timings are distinguished from each other, the phase calculation module 223 is able to uniquely determine the phase.

Alternatively, the zero-crossing detection module 221 may detect only one of the timing when the power source voltage varies from the positive value to the negative value and the timing when the power source voltage varies from the negative value to the positive value. If only one of these timings is detected, the phase calculation module 223 is able to uniquely determine the phase.

The detector 220 may be configured without the frequency determination module 222 if a power source frequency is uniform in the region where the communication apparatus 200 is used.

Figure 4:
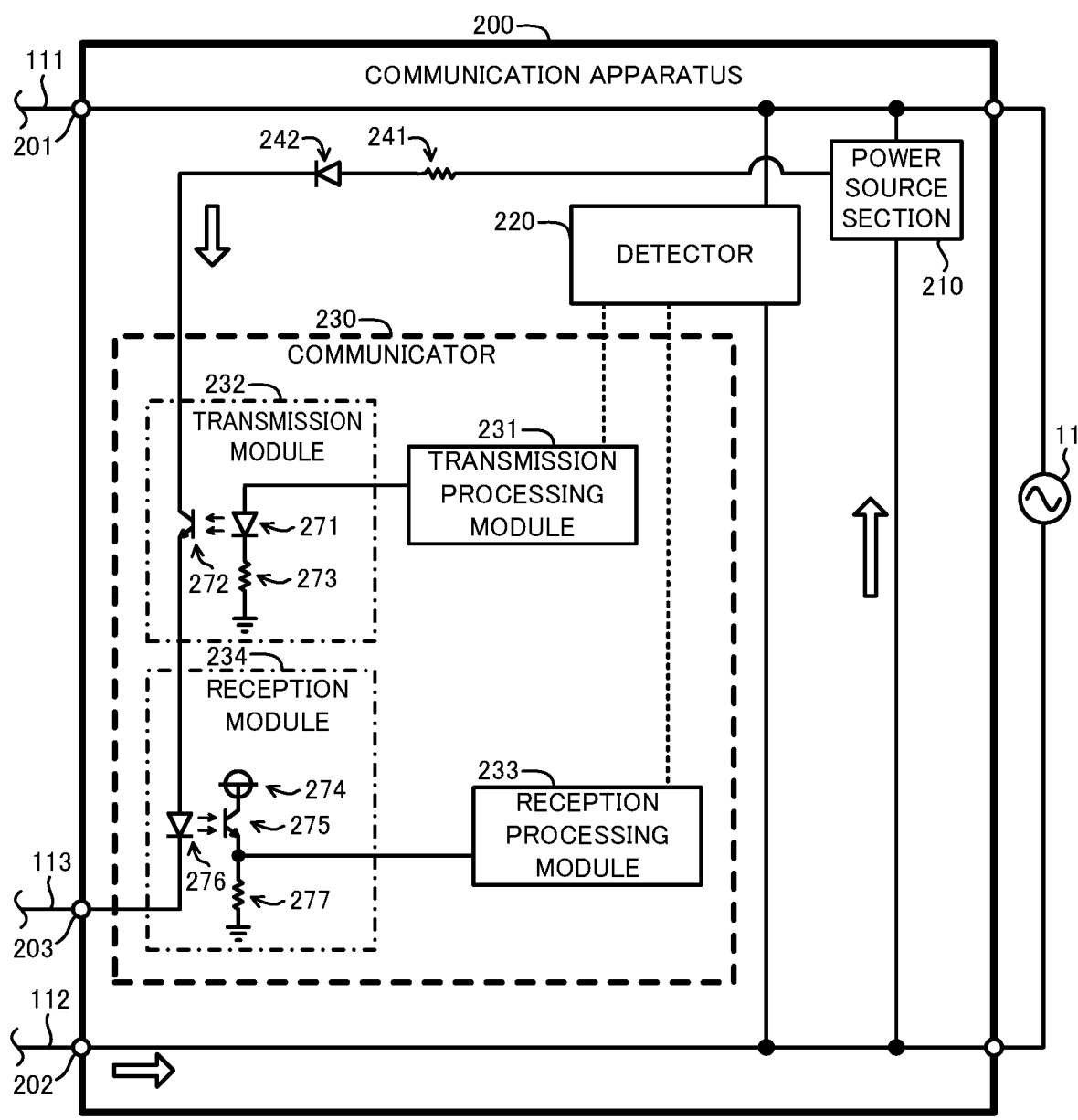
FIG. 4 is a first diagram illustrating a configuration of a communicator.

Referring back to FIG. 2, the communicator 230 functions as communication means of the communication apparatus 200. The communicator 230 includes a transmission processing module 231 for outputting signals to a transmission module 232, the signals corresponding to the electric current signals to be transmitted, the transmission module 232 for transmitting the electric current signals to the communication apparatus 300 in response to the output from the transmission processing module 231, a reception processing module 233 for receiving input signals corresponding to the received electric current signals, and a reception module 234 for outputting the signals to the reception processing module 233, the signals corresponding to the electric current signals received from the communication apparatus 300. The detailed configuration of the communicator 230 will now be described with reference to FIG. 4.

The transmission processing module 231 has an MPU and a RAM in the embodiment. The transmission processing module 231 controls the transmission module 232 based on data to be transmitted to the communication apparatus 300. The transmission processing module 231 also controls the timing of transmission of electric current signals that indicate data being series of binary values "0" and "1" based on the result of the detection by the detector 220.

Specifically, the transmission processing module 231 outputs a low level signal to the transmission module 232 during a period of transmission of the value "0" of the data being series of binary values and outputs a high level signal to the transmission module 232 during a period of transmission of the value "1" of the data being series of binary values. The transmission processing module 231 outputs an invalid signal at a low, high, or other level to the transmission module 232 during a period in which the phase detected by the detector 220 is within a specific range since this period is deemed to correspond to none of the values contained in the data. In other words, when the phase of the power source voltage is within the specific range, the transmission processing module 231 does not permit or prohibits transmission of electric current signals.

The transmission module 232 generates electric current signals by opening and closing of the signal circuit. The transmission module 232 has a photodiode 271 and a phototransistor 272 that constitute a photocoupler, and a resistor 273 that connects the photodiode 271 to the ground. The anode of the photodiode 271 is connected to the transmission processing module 231, while the cathode of the photodiode 271 is connected to the resistor 273. The collector terminal of the phototransistor 272 is connected to the diode 242, while the emitter terminal of the phototransistor 272 is connected to a photodiode 276 included in the reception module 234.

The transmission module 232 has the above-described configuration and thus opens and closes the signal circuit, which is a path of electric current signals, thereby switching between connection and disconnection of the current path. Specifically, if the transmission processing module 231 outputs a high level signal, the photodiode 271 emits light and the phototransistor 272 receives this light. This process connects the current path between the collector and emitter terminals of the phototransistor 272, resulting in a current flow in the signal circuit. The mode of the current flow in the signal circuit corresponds to the value "1" of the data being series of binary values to be transmitted. In contrast, if the transmission processing module 231 outputs a low level signal, the photodiode 271 does not emit light. This process disconnects the current path between the collector and emitter terminals of the phototransistor 272, resulting in no current flow in the signal circuit. The mode of no current flow in the signal circuit corresponds to the value "0" of the data being series of binary values to be transmitted. That is, the electric current signals are equivalent to time-series data containing the mode of "0" indicating no current flow in the signal circuit and the mode of "1" indicating a current flow in the signal circuit.

The transmission module 232 also connects or disconnects the signal circuit and thus causes the mode of "1" or "0" during a period when the phase detected by the detector 220 is within the specific range. The transmission module 232, however, transmits invalid signals during this period, without transmitting substantially valid electric current signals.

The reception processing module 233 has an MPU and a RAM in the embodiment. The reception processing module 233 acquires, from the reception module 234, signals corresponding to the electric current signals received by the reception module 234. The reception processing module 233 also controls the timing of reception of electric current signals that indicate data being series of binary values "0" and "1" based on the result of the detection by the detector 220.

Specifically, the reception processing module 233 determines reception of the value "1" contained in the electric current signals when the reception module 234 outputs a high level signal, and determines reception of the value "0" contained in the electric current signals when the reception module 234 outputs a low level signal. It should be noted that the reception processing module 233 determines no reception of the electric current signal when the phase detected by the detector 220 is within the specific range. In other words, when the phase of the power source voltage is within the specific range, the reception processing module 233 discards the received signals and determines that no electric current signal is received.

In general, the specific range within which the reception processing module 233 ignores the received electric current signals equals to the specific range within which the transmission processing module 231 does not transmit valid electric current signals.

The reception module 234 has a phototransistor 275 and the photodiode 276 that constitute a photocoupler, and a resistor 277 that connects the phototransistor 275 to the ground. The collector terminal of the phototransistor 275 is connected to a constant voltage source 274, while the emitter terminal of the phototransistor 275 is connected to the resistor 277 and the reception processing module 233. The anode of the photodiode 276 is connected to the phototransistor 272, while the cathode of the photodiode 276 is connected to the third terminal 203.

The reception module 234 has the above-described configuration and thus receives the electric current signals generated by opening and closing of the signal circuit. Specifically, the reception module 234 detects the presence of a current flow in the signal circuit and outputs a signal indicating a result of the detection to the reception processing module 233. More specifically, in the case of a current flow in the signal circuit, the photodiode 276 emits light and the phototransistor 275 receives this light. This process connects the current path between the collector and emitter terminals of the phototransistor 275, so that the voltage accordance with the constant voltage source 274 and the resistance of the resistor 277 is applied to the reception processing module 233, resulting in input of a high level signal to the reception processing module 233. The high level signal input to the reception processing module 233 corresponds to the value "1" of the data being series of binary values contained in the electric current signals. In contrast, in the case of no current flow in the signal circuit, the photodiode 276 does not emit light. This process disconnects the current path between the collector and emitter terminals of the phototransistor 275, so that the voltage of 0 V is applied to the reception processing module 233, resulting in input of a low level signal to the reception processing module 233. The low level signal input to the reception processing module 233 corresponds to the value "0" of the data being series of binary values contained in the electric current signals.

One end of the resistor 241 is connected to the power source section 210 and the other end of the resistor 241 is connected to the diode 242. The value of the resistor 241 is determined in accordance with the current value of the electric current signals. For example, the current value of the electric current signal is 10 mA. The anode of the diode 242 is connected to the resistor 241, while the cathode of the diode 242 is connected to the phototransistor 272. The diode 242 is provided to reduce reverse current occurring in the signal circuit in the case of improper connection, for example.

Referring back to FIG. 2, the communication apparatus 300 operates on the source power supplied from the alternating-current power source 11 through the power source line 111 and the shared line 112. The communication apparatus 300 includes a first terminal 301 for connection to the power source line 111, a second terminal 302 for connection to the shared line 112, a third terminal 303 for connection to the signal line 113, a detector 320 that detects the phase of the power source voltage, a communicator 330 for communication with the communication apparatus 200, a resistor 341, and a diode 342 that reduces reverse current. The power source voltage of the alternating-current power source 11 is applied between the first terminal 301 and the second terminal 302.

One end of the detector 320 is connected to the first terminal 301 and the other end of the detector 320 is connected to the second terminal 302. The detector 320 detects the phase of the source power supplied from the alternating-current power source 11. That is, the detector 320 detects the phase of the voltage applied between the first terminal 301 and the second terminal 302. The phase detected by the detector 320 is used in the communication by the communicator 330. The detector 320 has the same configuration as the detector 220, as illustrated in FIG. 3.

Figure 5:
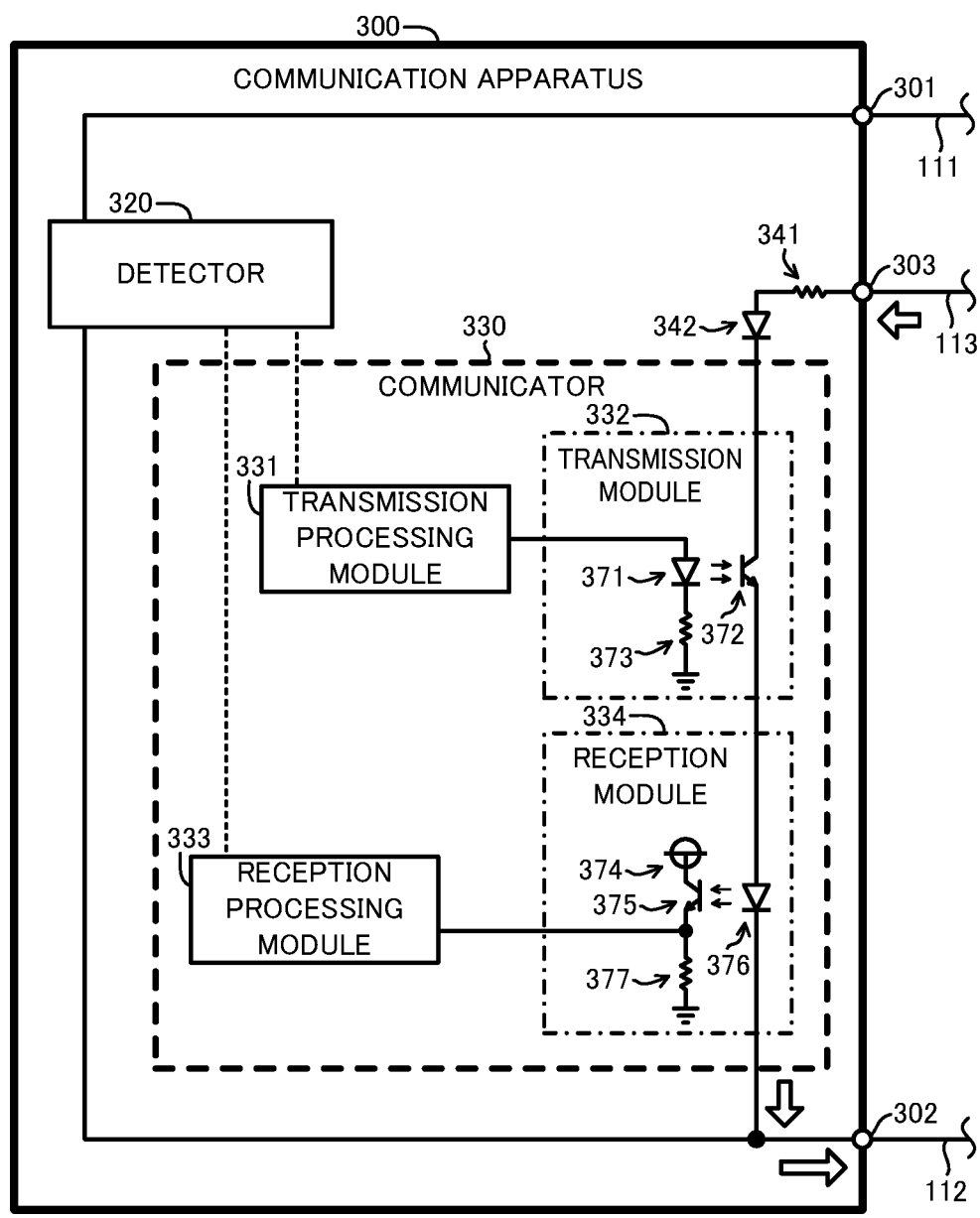
FIG. 5 is a second diagram illustrating a configuration of a communicator.

The communicator 330 includes a transmission processing module 331, a transmission module 332, a reception processing module 333, and a reception module 334. With reference to FIG. 5, the transmission processing module 331 has the same configuration as the transmission processing module 231 of the communicator 230, the transmission module 332 has the same configuration as the transmission module 232 of the communicator 230, the reception processing module 333 has the same configuration as the reception processing module 233 of the communicator 230, and the reception module 334 has the same configuration as the reception module 234 of the communicator 230.

The transmission processing module 331 prohibits, without permitting, transmission of electric current signals when the phase of the power source voltage detected by the detector 320 is within the specific range. The reception processing module 333 discards the signals acquired from the reception module 334 and determines no reception of the electric current signal when the phase of the power source voltage is within the specific range. The specific range within which the transmission processing module 331 does not transmit valid electric current signals is preliminarily determined to be equal to the specific range within which the reception processing module 233 of the communication apparatus 200 ignores the received electric current signals. In addition, the specific range within which the reception processing module 333 ignores the received electric current signals is preliminarily determined to be equal to the specific range within which the transmission processing module 231 of the communication apparatus 200 does not transmit valid electric current signals.

The transmission module 332 has a photodiode 371 and a phototransistor 372 that constitute a photocoupler, and a resistor 373 that connects the photodiode 371 to the ground. The anode of the photodiode 371 is connected to the transmission processing module 331, while the cathode of the photodiode 371 is connected to the resistor 373. The collector terminal of the phototransistor 372 is connected to the diode 342, while the emitter terminal of the phototransistor 372 is connected to a photodiode 376 included in the reception module 334.

The reception module 334 has a phototransistor 375 and the photodiode 376 that constitute a photocoupler, and a resistor 377 that connects the phototransistor 375 to the ground. The collector terminal of the phototransistor 375 is connected to a constant voltage source 374, while the emitter terminal of the phototransistor 375 is connected to the resistor 377 and the reception processing module 333. The anode of the photodiode 376 is connected to the phototransistor 372, while the cathode of the photodiode 376 is connected to the second terminal 302.

One end of the resistor 341 is connected to the third terminal 303 and the other end of the resistor 341 is connected to the diode 342. The value of the resistor 341 is determined in accordance with the current value of the electric current signals. The anode of the diode 342 is connected to the resistor 341, while the cathode of the diode 342 is connected to the phototransistor 372 of the transmission module 332. The diode 342 is provided to reduce reverse current occurring in the signal circuit in the case of improper connection, for example.

As illustrated in FIG. 2, the signal circuit connects the power source section 210, the resistor 241, the diode 242, the transmission module 232 and the reception module 234 of the communicator 230, the third terminal 203, the signal line 113, the third terminal 303, the resistor 341, the diode 342, the transmission module 332 and the reception module 334 of the communicator 330, the second terminal 302, the shared line 112, and the second terminal 202 in the order mentioned.

The communication apparatuses 200 and 300 are each capable of both of transmission and reception of electric current signals and thus execute two-way communication. The communication apparatuses 200 and 300, however, share the signal circuit for transmission of electric current signals and thus execute communication equivalent to so-called half-duplex communication. For example, when the communication apparatus 200 transmits electric current signals to the communication apparatus 300, the transmission processing module 331 of the communication apparatus 300 connects the current path of the transmission module 332, and the reception module 334 receives the electric current signals transmitted from the transmission module 232.

The timings of switching between transmission and reception in the communication apparatuses 200 and 300 are set in accordance with predetermined protocols. For example, after the start of supply of source power from the alternating-current power source 11, the communication apparatus 200 transmits a predetermined number of bits of electric current signals at a predetermined transmission rate while the communication apparatus 300 receives the electric current signals. Then, the communication apparatus 300 transmits electric current signals while the communication apparatus 200 receives the electric current signals. For example, the predetermined transmission rate is 1 or 10 kbps and the predetermined number of bits is 8 or 64 bits.

Figure 6:
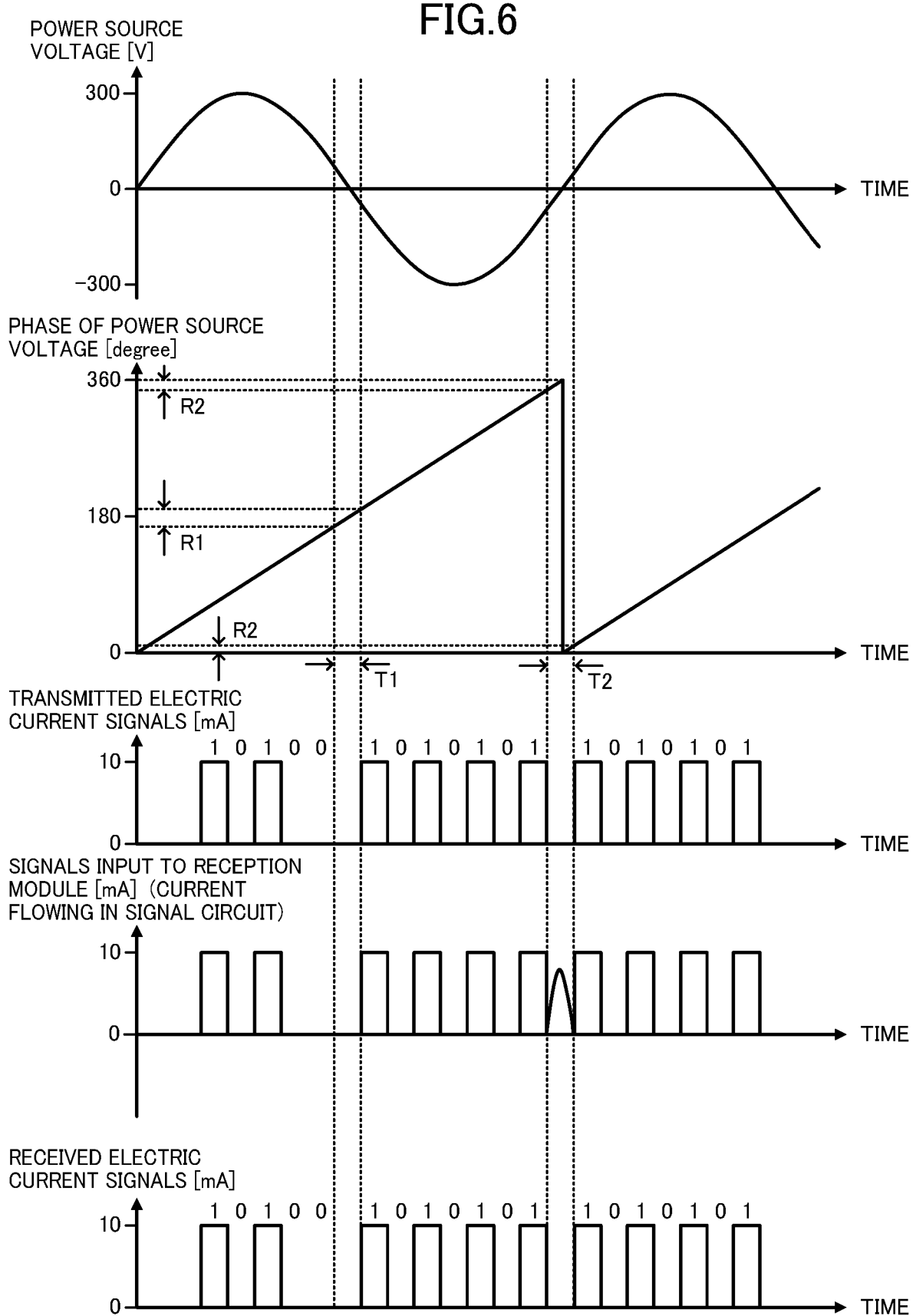
FIG. 6 is a diagram for explaining electric current signals.

The electric current signals transmitted between the communication apparatuses 200 and 300 will now be described with reference to FIG. 6. FIG. 6 illustrates the waveforms of a power source voltage supplied from the alternating-current power source 11, the phase of this power source voltage, electric current signals transmitted from the communication apparatus 200, signals input to the reception module 334 of the communication apparatus 300, and electric current signals received by the communication apparatus 300 with the common temporal axis. Among the waveforms illustrated in FIG. 6, the signals input to the reception module 334 equal to the current flowing in the signal circuit.

FIG. 6 illustrates an example in which the electric current signals indicating the data "1010 . . . 0101" are transmitted. The transmitted electric current signals have a combined pattern of rectangular pulses corresponding to the data "1" and waveforms having a value of zero and corresponding to the data "0". The current flowing in the power source line 111 and the shared line 112, however, significantly varies in periods around the timings of positive and negative sign reversal of the power source voltage. This phenomenon induces an electric current in the signal circuit including the shared line 112 and the signal line 113, thereby providing inductive noise to the electric current signals. The waveform of the signals input to the reception module 334 is defined by the waveform of the transmitted patterns on which the inductive noise is superimposed.

During specific periods T1 and T2 in which the inductive noise occurs, the transmission module 232 does not transmit an electric current signal corresponding to the data "1" or "0" and the reception processing module 333 does not receive an electric current signal. During the specific periods T1 and T2 in which the inductive noise occurs, the phase of the power source voltage is within a specific range R1 or R2. Accordingly, the communicators 230 and 330 execute at least one of transmission or reception except when the phase detected by the detectors 220 and 320 is within the specific range R1 or R2. In the example illustrated in FIG. 6, the specific range R1 ranges from 170° to 190° while the specific range R2 ranges from 350° to 10°.

Figure 7:
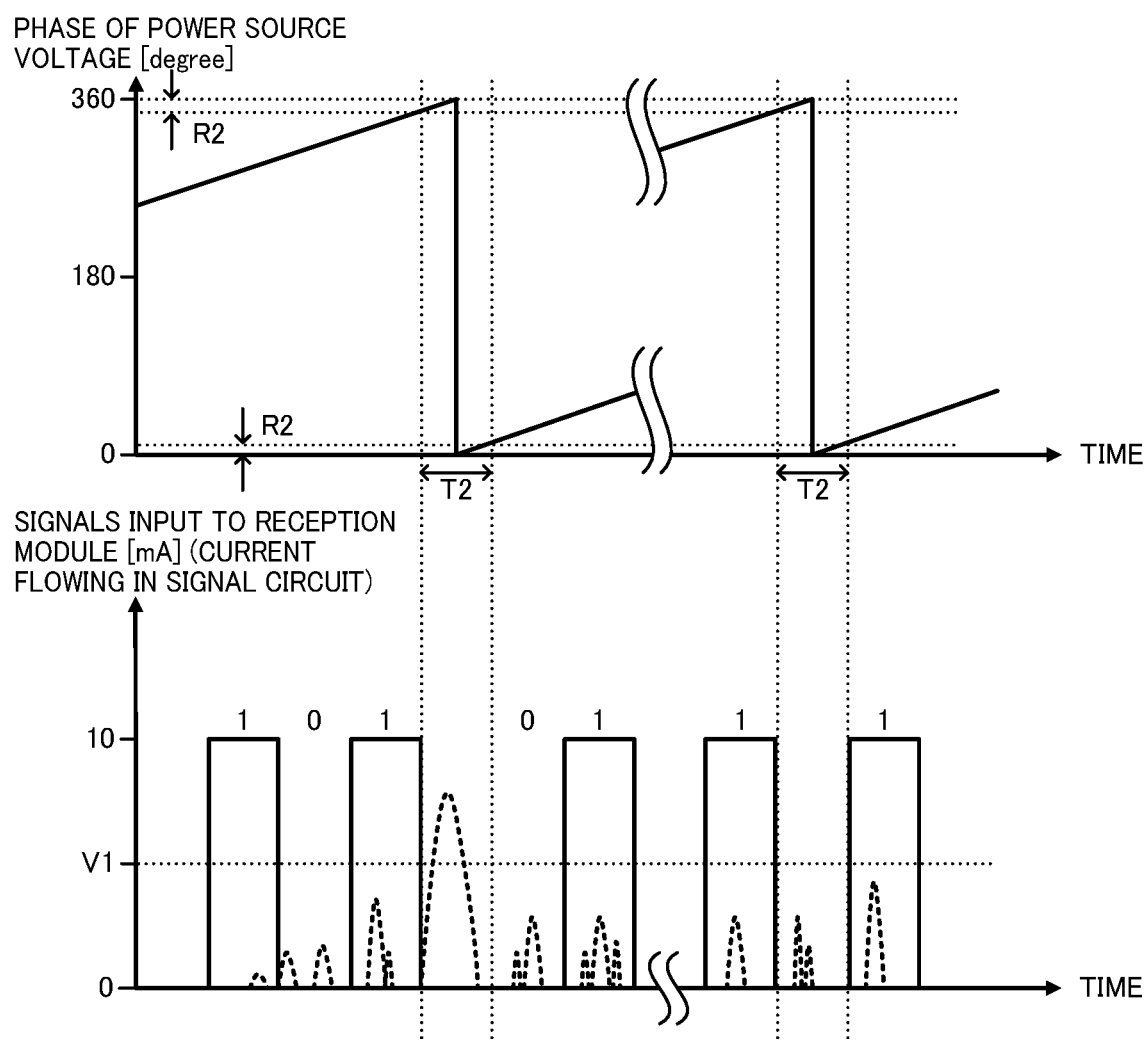
FIG. 7 is a diagram for explaining inductive noise.

The relationship between the specific ranges of the phase, the specific periods of the time, and the inductive noise will now be described in more detail with reference to FIG. 7. FIG. 7 illustrates the waveforms of the phase of the power source voltage and the signals input to the reception module 334 with the common temporal axis. With respect to the signals input to the reception module 334, the waveform of the current generated by the transmission module 232 is indicated by solid lines and the waveform of the inductive noise is indicated by dashed lines. FIG. 7 shows only the specific range R2 as a representative of the specific ranges R1 and R2 illustrated in FIG. 6 and shows only the specific period T2 as a representative of the specific periods T1 and T2 illustrated in FIG. 6.

As illustrated in FIG. 7, the inductive noise also occurs outside the specific period T2. It should be noted that the inductive noise during the specific period T2 is greater than a reference value V1 and causes a communication error at a certain probability. The reference value V1 is equal to the half of the current value indicating the data "1". In the example illustrated in FIG. 7, the current value indicating the data "1" is 10 mA and the reference value V1 is 5 mA. Alternatively, the reference value V1 may be set smaller than the value causing a communication error at a certain probability, to provide a margin for more robust communication. The reference value V1 may be 3 mA in the example illustrated in FIG. 7.

Although the specific period T2 starts and ends periodically, not every specific period T2 has inductive noise greater than the reference value V1. The value of the inductive noise varies with time in accordance with the electric power consumed by the communication apparatus 300. The maximum value of the inductive noise varies in accordance with the parameters, such as the normal rated power of the communication apparatus 300 and the impedances of the communication apparatus 300 and the cable 110. The specific period T2 is thus a period in which the maximum value of possible inductive noise is greater than the reference value V1.

That is, the specific range R2 is a range in which an induced electrical current greater than the reference value V1 flows in the signal circuit. In other words, the specific range R2 is a range in which an induced electric current flowing in the signal circuit has the maximum value greater than the reference value V1.

Although the specific periods T1 and T2 in FIGS. 6 and 7 include the timings when the power source voltage passes through 0 V to facilitate understanding, this example should not be construed as limiting the scope of the present disclosure. The specific periods T1 and T2 may differ from those illustrated in FIGS. 6 and 7 depending on the impedances of the communication apparatus 300 and the cable 110. For example, the specific periods T1 and T2 may correspond to a specific range R1 of 10° to 20° and a specific range R2 of 190° to 200°, respectively.

As described above, in the communication system 100 according to the embodiment, the communication apparatuses 200 and 300 communicate with each other except when the phase is within the specific range. When the phase is within the specific range, a relatively large induced electric current flows in the signal circuit and thus may cause a communication error, as illustrated in FIG. 8.

Figure 8:
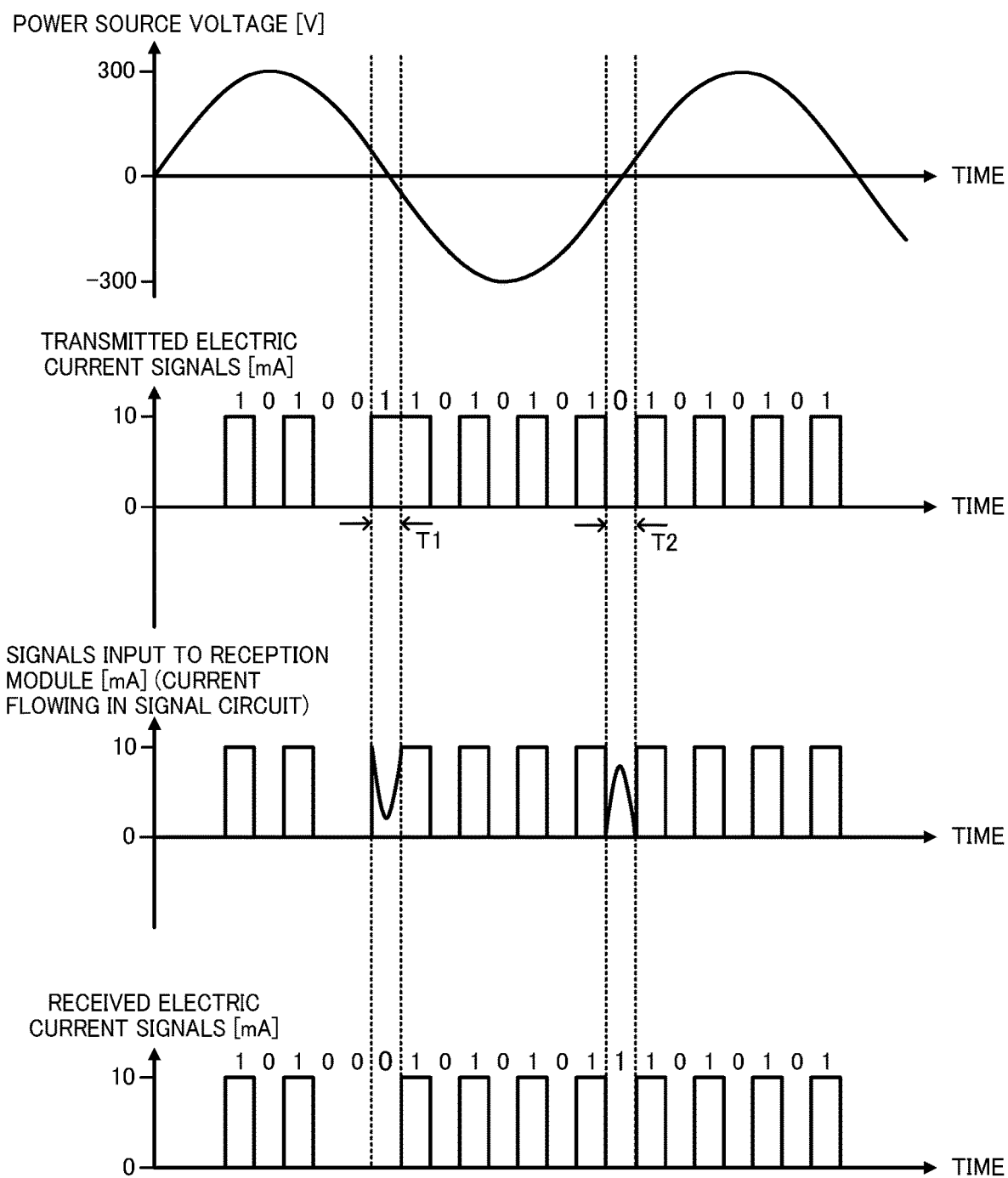
FIG. 8 illustrates a case in which communication is executed when the phase is within a specific range.

FIG. 8 illustrates a case in which electric current signals are transmitted and received during the specific periods T1 and T2. In the example illustrated in FIG. 8, an electric current signal indicating the value "1" is transmitted during the specific period T1 and an electric current signal indicating the value "0" is transmitted during the specific period T2. The waveforms of the current flowing in the signal circuit during the specific periods T1 and T2 are distorted due to inductive noise. Accordingly, the electric current signal received by the reception processing module 333 indicates "0" in the specific period T1 and indicates "1" in the specific period T2. That is, sign errors are caused in the communication between the communication apparatuses 200 and 300.

One idea to solve the problem is to provide the electric current signals transmitted and received during the specific periods T1 and T2 with an error detecting code in case of a sign error due to inductive noise, since the specific periods T1 and T2 do not always have large inductive noise, as described above. Unfortunately, the error detecting code provided to the transmitted data despite of few sign errors leads to a decrease in the substantial transmission rate.

In contrast, the communication system 100 according to the embodiment does not execute communication during the specific periods T1 and T2, as illustrated in FIG. 6. That is, the communication system 100 executes communication only during the periods other than the specific periods T1 and T2. In other words, the communication system 100 does not execute communication when the phase is within the specific range R1 or R2. That is, the communication system 100 executes communication except when the phase is within the specific range R1 or R2. The specific periods T1 and T2 and the specific ranges R1 and R2 are defined as the periods and ranges in which the induced electric current greater than the reference value V1 flows in the signal circuit and thus can cause a sign error. The communication system 100 thus executes communication while avoiding the adverse effects of inductive noise due to the alternating-current voltage supplied from the alternating-current power source 11. This configuration can achieve highly reliable communication without the adverse effects of inductive noise, thereby improving the quality of communication, despite of a long cable 110.

Embodiment 2

Embodiment 2 will now be described focusing on the differences from the above-described Embodiment 1. The components similar or corresponding to those in Embodiment 1 are provided with the same reference symbols as Embodiment 1 without redundant or detailed descriptions. The communication system 100 according to this embodiment differs from the system according to Embodiment 1 in the adjustment of specific ranges.

Figure 9:
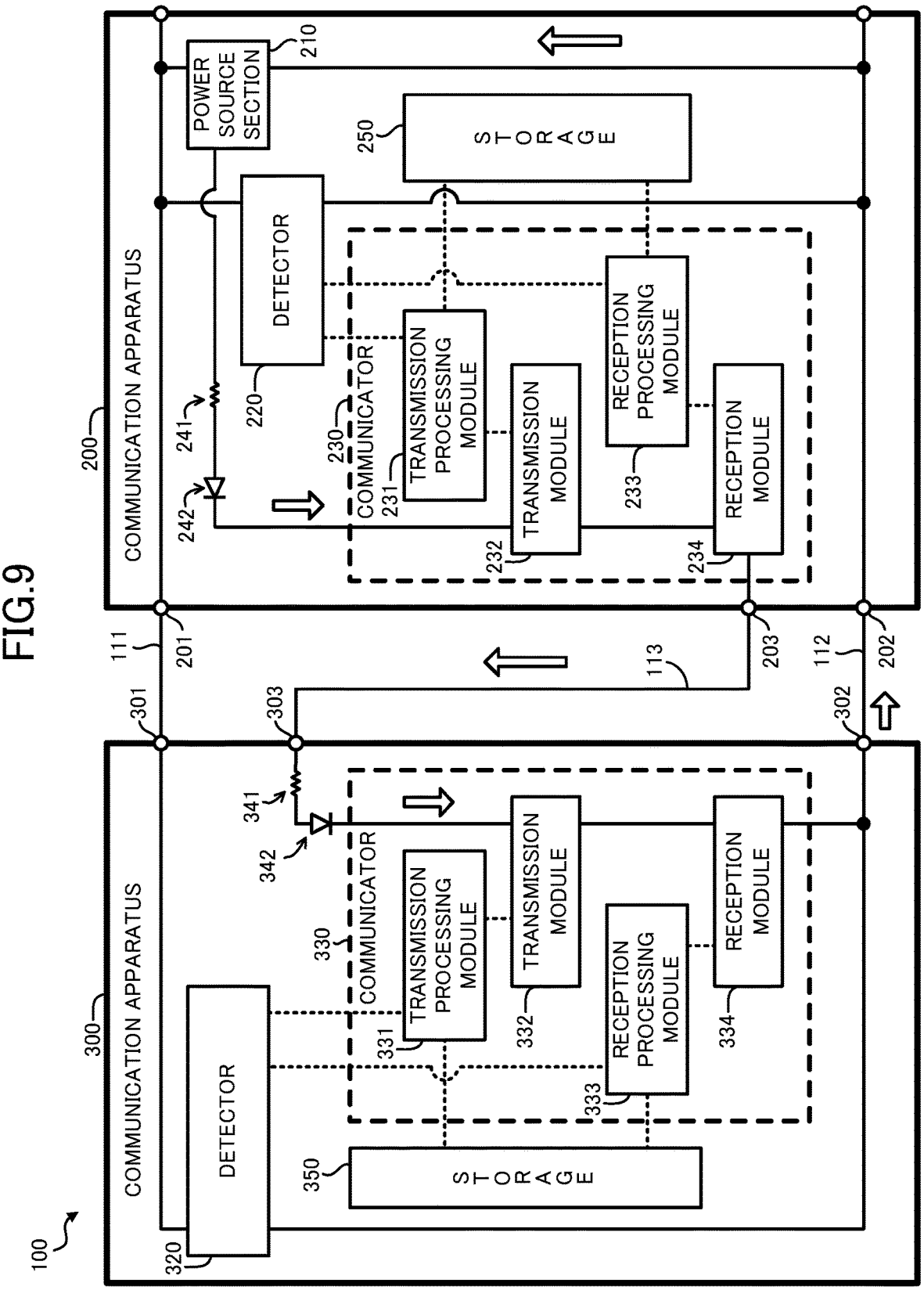
FIG. 9 illustrates configurations of communication apparatuses according to Embodiment 2.

With reference to FIG. 9, the communication apparatus 200 includes a storage 250 and the communication apparatus 300 includes a storage 350 in the embodiment. The storages 250 and 350 each have a non-volatile memory, such as a flash memory.

Each of the storages 250 and 350 stores a range table 251 illustrated in FIG. 10. The range table 251 is a collection of data each indicating a range of phase. In this embodiment, the ranges of phase are labeled as "R(i)" where i is an integer from 1 to m. The range table 251 is preliminarily defined such that the width of the range R(i) decreases as the value of i increases. The range R(1) is the initial value of the specific range and provides sufficient noise resistance. In contrast, the range R(m) is the minimum specific range. The symbol "--" for the range R(m) in FIG. 10 means that the width of the specific range is zero, that is, substantially no specific range exists. The integer m may be any number, for example, 7, 10, or 30.

Figure 11:
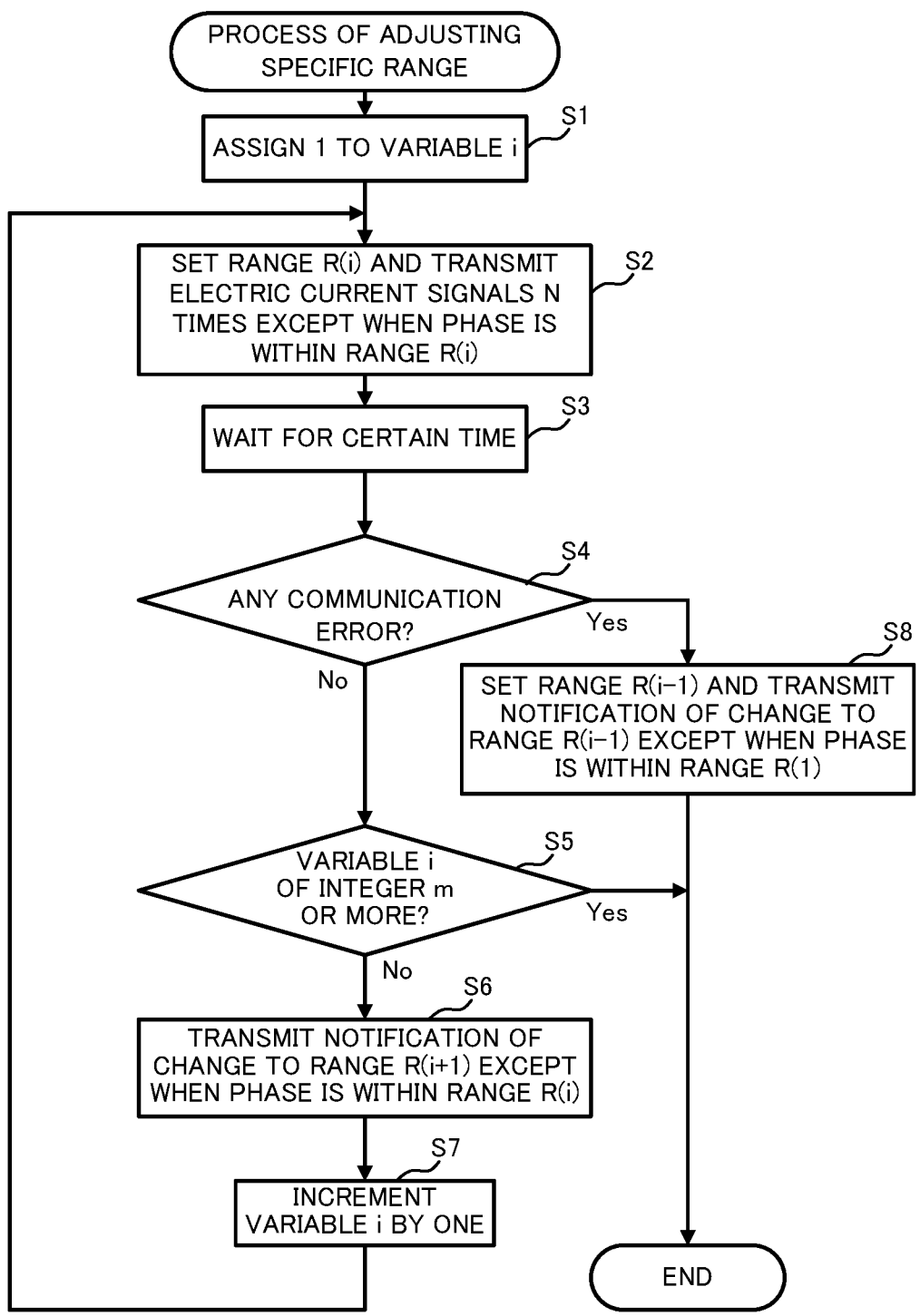
FIG. 11 is a flowchart illustrating a process of adjusting the specific range.

A process of adjusting the specific range according to the embodiment will now be explained with reference to FIG. 11. The process illustrated in FIG. 11 involves changing the specific range at certain time intervals, executing communication multiple times after every change in the range, and selecting the minimum specific range among the ranges having no communication error. The following explanation focuses on an example in which the communication apparatus 200 mainly performs the adjustment of the specific range. This process starts in response to supply of the power source voltage from the alternating-current power source 11 to the communication apparatuses 200 and 300. That is, the communication system 100 executes the adjusting process at the time of activation.

In the process of adjusting the specific range, the communication apparatus 200 assigns 1 to the variable i (Step S1). Specifically, the transmission processing module 231 assigns 1 as initial value to the variable i stored in the RAM. Although the process of adjusting the specific range is mainly executed by the transmission processing module 231, the following explanation states that the communication apparatus 200 executes the process as appropriate.

Then, the communication apparatus 200 sets the specific range to the range R(i) and transmits electric current signals N times except when the phase is within the range R(i) (Step S2). If i is the initial value, the communication apparatus 200 certainly transmits electric current signals N times except when the phase is within the range R(1) that is sufficiently wide to encompass the range having inductive noise. The value N is preliminarily defined and is, for example, 5 or 10. The electric current signals transmitted in Step S2 is a data that requests the communication apparatus 300 to respond to the signals. The occurrence of a communication error is determined based on the existence of such a response to the request or the content of the response.

The communication apparatus 300 sets the specific range to the range R(1) as initial value at supply of power.

The communication apparatus 200 then waits for a certain time (Step S3). The certain time is, for example, 10 or 100 ms.

The communication apparatus 200 then determines whether any communication error occurs (Step S4). For example, the communication apparatus 200 determines the occurrence of a communication error if the communication apparatus 200 waits for the certain time in Step S3 but does not receive at least one of the responses to the electric current signals transmitted N times in Step S2 from the communication apparatus 300 as communication partner.

If determining no communication error (No in Step S4), the communication apparatus 200 determines whether the variable i is at least the predetermined integer m (Step S5). If determining the variable i to be the integer m or more (Yes in Step S5), the communication apparatus 200 terminates the process of adjusting the specific range.

In contrast, if determining the variable i to be smaller than the integer m (No in Step S5), the communication apparatus 200 notifies the communication apparatus 300 of change in the specific range to the range R(i+1) except when the phase is within the range R(i) (Step S6). Specifically, the communication apparatus 200 transmits electric current signals indicating that the width of the specific range is decremented by one level to the communication apparatus 300. The communication apparatus 300 thus sets the specific range to the range R(i+1).

The communication apparatus 200 then increments the variable i by one (Step S7). Thereafter, the communication apparatus 200 returns to Step S2 and repeats the following steps thereof.

If determining any communication error in Step S4 (Yes in Step S4), the communication apparatus 200 sets the specific range to the range R(i−1) and notifies the communication apparatus 300 of change in the specific range to the range R(i−1) except when the phase is within the range R(1) (Step S8). Specifically, the communication apparatus 200 transmits electric current signals indicating that the width of the specific range is incremented by one level to the communication apparatus 300. The communication apparatus 300 thus sets the specific range to the range R(i−1). If the variable i is 1, the communication apparatus 200 maintains the range R(1) as it is without changing the specific range. In this case, the communication apparatus 200 may notify an administrator of the communication system 100 that the system cannot readily avoid communication errors.

The communication apparatus 200 then terminates the process of adjusting the specific range. At the end of the process, the communication apparatus 200 transmits electric current signals indicating the end of the process to the communication apparatus 300 except when the phase is within the set specific range.

As explained above, the communication system 100 according to the embodiment adjusts the width of the specific range in which communication is invalidated. This adjustment can avoid the specific range from being excessively wide. The communication system 100 can therefore execute communication at high efficiency while ensuring sufficient noise resistance.

The above-described embodiments of the present disclosure should not be construed as limiting the scope of the present disclosure.

Figure 12:
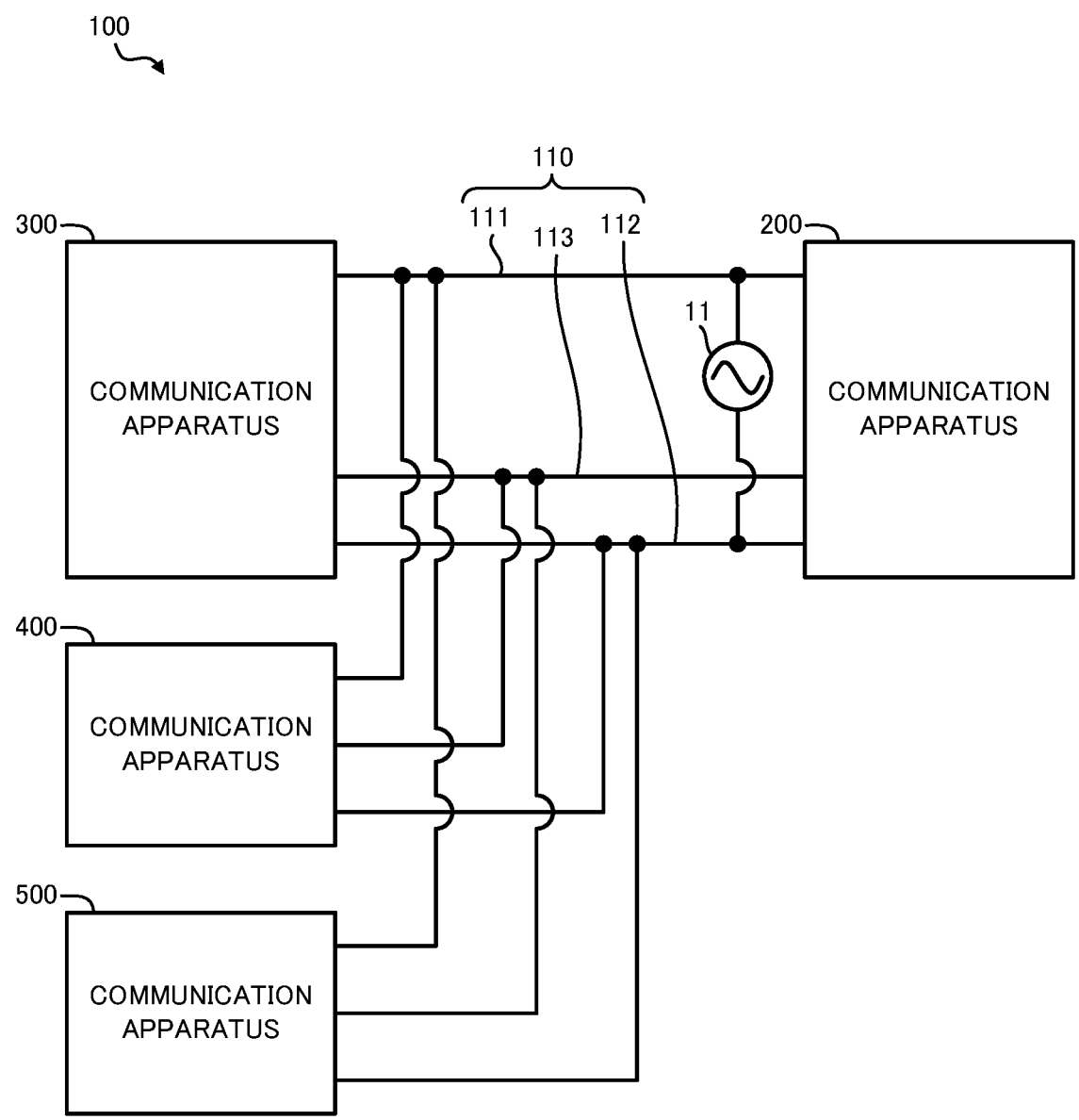
FIG. 12 illustrates a schematic configuration of a communication system according to a modification.

For example, although the alternating-current power source 11 supplies electric power via the communication apparatus 200 to the communication apparatuses 300, 400, and 500 in the above embodiments, this configuration should not be construed as limiting the scope of the present disclosure. For example, the alternating-current power source 11 may supply electric power via the communication apparatus 300 to the communication apparatuses 200, 400, and 500. Alternatively, with reference to FIG. 12, the alternating-current power source 11 may be placed between the communication apparatus 200 and the communication apparatuses 300, 400, and 500 and supply alternating-current power to each of the communication apparatuses 200, 300, 400, and 500. That is, the power source line 111 and the shared line 112 are only required to supply alternating-current power to at least one of the communication apparatuses 200, 300, 400, and 500.

Although the communication apparatuses 200 and 300 execute two-way communication in the above embodiments, this configuration should not be construed as limiting the scope of the present disclosure. For example, the communication apparatus 200 may be configured without the reception processing module 233 and the reception module 234 and the communication apparatus 300 may be configured without the transmission processing module 331 and the transmission module 332. In this case, electric current signals are transmitted in one direction from the communication apparatus 200 to the communication apparatus 300. Alternatively, the communication apparatus 200 may be configured without the transmission processing module 231 and the transmission module 232 and the communication apparatus 300 may be configured without the reception processing module 333 and the reception module 334. In this case, electric current signals are transmitted in one direction from the communication apparatus 300 to the communication apparatus 200.

The specific range may be adjusted by any procedure other than the process explained in Embodiment 2. For example, the communication apparatuses 200 and 300 may be configured without the storages 250 and 350 and adjust the specific range to any range in accordance with a predetermined procedure. In addition, the process of adjusting the specific range may be executed at any timing designated by the administrator of the communication system 100 other than at supply of power.

Figure 13:
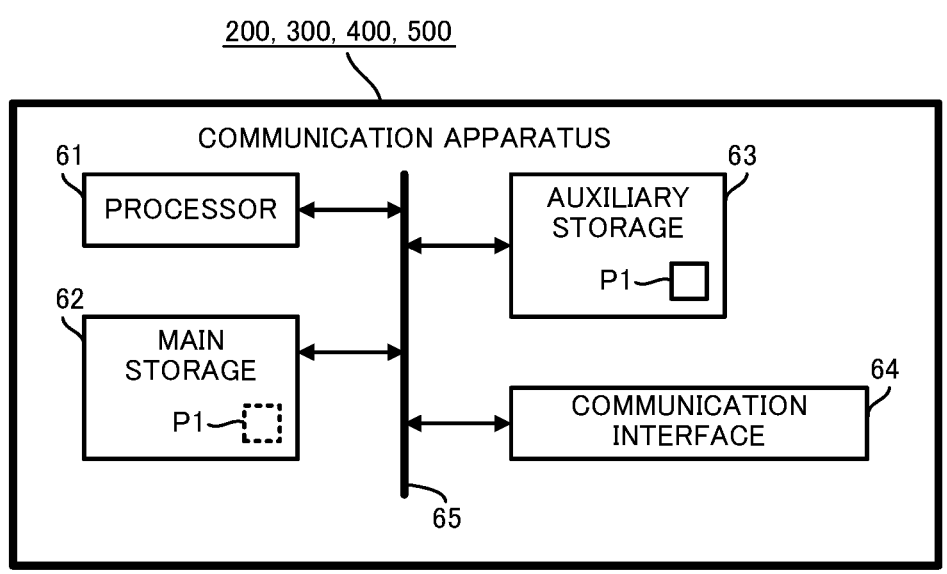
FIG. 13 illustrates a configuration of a communication apparatus as a computer.

The communication apparatuses 200, 300, 400, and 500 may be configured as a computer. FIG. 13 illustrates a configuration of a communication apparatus 200, 300, 400, or 500 as a computer. The communication apparatuses 200, 300, 400, and 500 each includes a processor 61, a main storage 62, an auxiliary storage 63, and a communication interface 64, as illustrated in FIG. 13. The main storage 62, the auxiliary storage 63, and the communication interface 64 are connected to the processor 61 via an internal bus 65.

The processor 61 has an MPU. The processor 61 performs the overall control of the constituent elements of the communication apparatuses 200, 300, 400, and 500 by executing a program P1 stored in the auxiliary storage 63. The processor 61 also functions as the frequency determination module 222 and the phase calculation module 223 (refer to FIG. 3) of the detector 220, functions as the transmission processing module 231 or 331 and the reception processing module 233 or 333 (refer to FIG. 2), and executes the process of adjusting the specific range (refer to FIG. 11) by executing the program P1.

The main storage 62 has a RAM. The program P1 is loaded into the main storage 62. The main storage 62 serves as a work area of the processor 61.

The auxiliary storage 63 has a non-volatile read-write semiconductor memory, such as an electrically erasable programmable read-only memory (EEPROM), a flash memory, or a hard disk drive (HDD). The auxiliary storage 63 stores various types of data used in operations in the processor 61, in addition to the program P1. The data contains the range table illustrated in FIG. 10. The auxiliary storage 63 provides the processor 61 with the data to be used by the processor 61 and stores data output from the processor 61.

The communication interface 64 enables the communication apparatus 200, 300, 400, and 500 to communicate with external devices. The communication interface 64 functions as the transmission module 232 or 332 and the reception module 234 or 334 (refer to FIG. 2).

The functions of the communication apparatuses 200, 300, 400, and 500 may be achieved by dedicated hardware or an ordinal computer system.

For example, the program P1 stored in the auxiliary storage 63 may be stored in a non-transitory computer-readable recording medium for distribution and then installed in a computer to configure an apparatus performing the above-explained operations.

The program P1 may also be stored in a disk drive included in a server device on a communication network, such as the Internet, and may be downloaded to a computer by being superimposed on a carrier wave, for example.

Alternatively, the program P1 may be activated while being transferred through a communication network to perform the above-explained operations.

A server device may execute all or part of the program P1 and a computer may execute the program P1 while transmitting and receiving information on the executed processes to and from the server device via a communication network, to perform the above-explained operations.

In the case in which the above-described functions are achieved by an operating system (OS) or by cooperation of the OS and applications, only the components other than the OS may be stored in a medium for distribution or downloaded to a computer.

The means for performing the functions of the communication system 100 is not limited to software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is appropriate for communication between communication apparatuses.

The invention claimed is:

1. A communication apparatus for connection to another communication apparatus via a power source line, a signal line, and a shared line, the communication apparatus comprising:
a detector configured to detect a phase of an alternating-current voltage applied between a first terminal for connecting to the power source line and a second terminal for connecting to the shared line; and
a communicator configured to communicate with the another communication apparatus by executing at least one of transmission or reception of an electric current signal except when the phase detected by the detector is within a specific range, the electric current signal being generated by opening and closing of a circuit that includes the signal line and the shared line,
wherein the specific range is defined as a range in which an induced electric current flowing through the signal line due to the alternating-current voltage is greater than a reference value.

2. The communication apparatus according to claim 1, wherein the communicator communicates with the another communication apparatus by transmitting the electric current signal except when the phase detected by the detector is within the specific range and transmitting an invalid signal when the phase detected by the detector is within the specific range.

3. The communication apparatus according to claim 1, wherein the communicator communicates with the another communication apparatus by receiving the electric current signal except when the phase detected by the detector is within the specific range and discarding the received signal when the phase detected by the detector is within the specific range.

4. The communication apparatus according to claim 1, wherein the communicator adjusts a width of the specific range.

5. A communication method by a communication apparatus for connection to another communication apparatus via a power source line, a signal line, and a shared line, the communication method comprising:
communicating with the another communication apparatus by executing at least one of transmission or reception of an electric current signal except when a phase of an alternating-current voltage is within a specific range, the electric current signal being generated by opening and closing of a circuit that includes the signal line and the shared line, the alternating-current voltage being applied between a first terminal for connecting to the power source line and a second terminal for connecting to the shared line,
wherein the specific range is defined as a range in which an induced electric current flowing through the signal line due to the alternating-current voltage is greater than a reference value.

6. A non-transitory computer-readable recording medium storing a program for causing a computer for connection to a communication apparatus via a power source line, a signal line, and a shared line to execute:
communication with the communication apparatus by executing at least one of transmission or reception of an electric current signal except when a phase of an alternating-current voltage is within a specific range, the electric current signal being generated by opening and closing of a circuit that includes the signal line and the shared line, the alternating-current voltage being applied between a first terminal for connecting to the power source line and a second terminal for connecting to the shared line,
wherein the specific range is defined as a range in which an induced electric current flowing through the signal line due to the alternating-current voltage is greater than a reference value.

* * * * *